(12) United States Patent
Blanchet

(10) Patent No.: US 10,307,979 B2
(45) Date of Patent: Jun. 4, 2019

(54) PART OBTAINED BY SELECTIVE MELTING OF A POWDER COMPRISING A MAIN ELEMENT AND RIGID SECONDARY ELEMENTS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Etienne Blanchet, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 644 days.

(21) Appl. No.: 14/768,206

(22) PCT Filed: Feb. 12, 2014

(86) PCT No.: PCT/EP2014/052730
§ 371 (c)(1),
(2) Date: Aug. 14, 2015

(87) PCT Pub. No.: WO2014/124969
PCT Pub. Date: Aug. 21, 2014

(65) Prior Publication Data
US 2016/0009039 A1 Jan. 14, 2016

(30) Foreign Application Priority Data

Feb. 15, 2013 (FR) ........................................ 13 51325

(51) Int. Cl.
  B29D 30/06 (2006.01)
  B22F 3/105 (2006.01)
  (Continued)

(52) U.S. Cl.
  CPC ........ *B29D 30/0601* (2013.01); *B22F 3/1055* (2013.01); *B22F 5/003* (2013.01);
  (Continued)

(58) Field of Classification Search
  CPC .................................................. B29D 30/0601
  (Continued)

(56) References Cited

U.S. PATENT DOCUMENTS 3,655,818 A * 4/1972 McKown .................. B32B 3/12
                                                        428/118
2004/0031780 A1   2/2004 Hagemeister et al.
2011/0309230 A1  12/2011 Lauwers et al.

FOREIGN PATENT DOCUMENTS

WO   WO97/11837 A1    4/1997
WO   WO-9711837 A1 *  4/1997  ............. B29C 41/12
(Continued)

OTHER PUBLICATIONS

International Search Report for PCT/EP2014/052730 dated May 15, 2014.

*Primary Examiner* — Brent T O'Hern
(74) *Attorney, Agent, or Firm* — Dickinson Wright PLLC

(57) ABSTRACT

A part obtained by selective melting of a powder on a support plate having a main element and rigid secondary elements arranged between the main element and the support plate, and adapted to be detached from the main element. All or part of the secondary elements comprises a body of thickness E and a head of width L greater than the thickness E of this body, the body connected to the support plate and the head connected to main element. All or part of (Continued)

the secondary elements includes a region of connection between the head and the body. The head of the secondary element extends over at most half the height H of this element.

11 Claims, 4 Drawing Sheets

(51) Int. Cl.
| | |
|---|---|
| *B22F 5/00* | (2006.01) |
| *B33Y 80/00* | (2015.01) |
| *B33Y 10/00* | (2015.01) |
| *B23K 26/342* | (2014.01) |
| *B23K 15/00* | (2006.01) |
| *B23K 26/00* | (2014.01) |
| *B28B 1/00* | (2006.01) |
| *B29C 64/153* | (2017.01) |
| *B29C 64/40* | (2017.01) |
| *B23K 103/00* | (2006.01) |
| *B29L 31/00* | (2006.01) |

(52) U.S. Cl.
CPC .......... *B22F 5/007* (2013.01); *B23K 15/0086* (2013.01); *B23K 15/0093* (2013.01); *B23K 26/0006* (2013.01); *B23K 26/342* (2015.10); *B28B 1/001* (2013.01); *B29C 64/153* (2017.08); *B29C 64/40* (2017.08); *B29D 30/0606* (2013.01); *B33Y 10/00* (2014.12); *B33Y 80/00* (2014.12); *B22F 2003/1058* (2013.01); *B23K 2103/42* (2018.08); *B23K 2103/50* (2018.08); *B23K 2103/52* (2018.08); *B29D 2030/0614* (2013.01); *B29L 2031/757* (2013.01); *Y02P 10/292* (2015.11); *Y02P 10/295* (2015.11)

(58) Field of Classification Search
USPC .................................................. 428/119
See application file for complete search history.

(56) References Cited

FOREIGN PATENT DOCUMENTS

| WO | WO2010/072960 A2 | 7/2010 |
| WO | WO2012/131481 A1 | 10/2012 |

\* cited by examiner

PART OBTAINED BY SELECTIVE MELTING OF A POWDER COMPRISING A MAIN ELEMENT AND RIGID SECONDARY ELEMENTS

This application is a 371 national phase entry of PCT/EP2014/052730, filed 12 Feb. 2014, which claims benefit to French Patent Application No. 1351325, field 15 Feb. 2013, the entire contents of which are incorporated herein by reference.

BACKGROUND

Field

The present disclosure relates to the manufacture of molding elements for vulcanizing and molding tires, and more particularly to the manufacture of molding elements obtained by the selective melting of a powder.

Description of Related Art

It is known practice to create a molding element using a method of selective melting, more commonly referred to as sintering. This method uses a beam of energy to melt a powder. A "beam of energy" means electromagnetic radiation (for example a laser beam) or a beam of particles (for example an electron beam).

A sintering method using a laser, hereinafter referred to as a laser sintering method, is known from document EP1641580. In that document, a first layer of powder is spread on a support plate by a layering member. All or some of the particles of powder of this first layer of powder are then agglomerated by the laser beam according to the shape of the object that is to be obtained. Once this step has been performed, a second layer of powder is spread on the first layer of powder so that it in turn can be selectively melted using the laser. By repeating these operations of spreading a layer and fusing using a laser, a sintered object is built up layer by layer.

Document WO2010072960 discloses a method for manufacturing a molding element using sintering. The molding element thus comprises a bar, denoted 24 in that document, and fins 26. In that method, secondary elements are produced at the same time as this molding element. The secondary elements notably comprise support parts 36 and joining parts denoted 28. The support parts have a thickness corresponding substantially to the thickness of the molding element and the joining parts have a smaller thickness than these support parts so that they can form break lines facilitating the detachment of the molding element from the support plate. Now, the manufacture of the secondary elements is expensive because it entails melting a large quantity of powder. Furthermore, the use of these secondary elements is limited because they are scrapped once the molding element has been detached from the support plate.

There is therefore still a need to optimize the use of the secondary elements when creating a molding element using sintering, so as to make the manufacture of such elements less expensive.

Definitions

A "tire" means all types of resilient tread whether or not it is subjected to an internal pressure.

The "tread" of a tire means a quantity of rubbery material delimited by lateral surfaces and by two main surfaces one of which is intended to come into contact with a road surface when the tire is being driven on.

A "mold" means a collection of separate molding elements which, when brought closer together, delimit a toroidal molding space for vulcanizing and molding a tire.

A "molding element" means part of a mold. A molding element is, for example, part of a lining intended to mold raised elements in the tread of the tire.

SUMMARY

The invention, in an embodiment, relates to a part obtained by selective melting of a powder on a support plate. This part comprises a main element and a plurality of rigid secondary elements, arranged between the main element and the support plate. All or part of the secondary elements comprises a body of thickness E and a head of width L which is greater than the thickness E of this body. The body is connected to the support plate and the head is connected to the main element. All or part of the secondary elements comprises a region of connection between the head and the body. The head of the secondary element extends over at most half the height H of this element.

The invention, in another embodiment, proposes manufacturing a main element and secondary elements during one and the same manufacturing operation in order to form a sintered part. Because these secondary elements are arranged under the main element they will support the main element while it is being manufactured. Once the main element has been manufactured, the secondary elements also make it easier for the main element to be detached from the support plate. Because the powder is layered, the secondary elements are subjected to high levels of stress while the main element is being manufactured. By providing regions of connection between the bodies and the heads of the secondary elements, the mechanical integrity of the secondary elements is enhanced and the manufacture of the main element is consequently improved. Furthermore, by limiting the thickness of the head, the consumption of powder for producing the secondary element is limited.

In one alternative form of embodiment, the head of the secondary element extends over at most ⅓ of the height H of the secondary element.

By limiting the thickness of the head further, the consumption of material in the creation of the secondary element is limited still further.

In another alternative form of embodiment, the region of connection has a blend radius R.

By providing a progressively rounded connection, connection between the head and the body of the secondary element is simplified and the risk of cracks being generated at the region of connection is consequently limited.

In one alternative form of embodiment, the head widens progressively from the body with a divergence α.

In this way, the main element can enjoy maximum support while at the same time minimizing contact between the secondary elements and the support plate. Furthermore, the progressive widening given to the head limits the creation of incipient fractures in the secondary elements, thereby assuring these secondary elements greater mechanical strength.

The divergence of the head is between 20° and 140°.

With such a divergence, the main element is guaranteed good support by the secondary elements.

For preference, the divergence of the head is between 90° and 120°.

In another alternative form of embodiment, the width of the head is at least equal to twice the thickness of the body.

In this way, the support of the main element by the secondary elements is improved.

In another alternative form of embodiment, the heads of the secondary elements meet at the main element so that this main element rests entirely on the secondary elements.

By making the main element rest entirely on the heads of the secondary elements, manufacture of this main element is improved. Indeed the heads of the secondary elements are made up of melted powder. The collection of heads thus forms a continuous support on which the first layer of powder of which the main element is made can be laid and melted suitably.

In another alternative form of embodiment, the head comprises means of detachment for detaching the main element from the secondary element.

This then makes separating the main element from the secondary elements once this main element has been manufactured easier.

In another alternative form of embodiment, all or part of the secondary elements has an inclined body making an angle β greater than or equal to 20° with the support plate.

Thus the secondary elements can be oriented in opposition with respect to the direction of layering of the powder. This allows the secondary elements better to absorb the loadings associated with this layering during the manufacture of the part.

Another subject of the invention relates to a method of manufacturing a molding element intended to be placed in a mold for vulcanizing and molding a tire tread, this molding element being created by selective melting of a powder on a support plate. The method comprises the creation of a plurality of secondary elements, all or part of these secondary elements comprising a body of thickness E and a head of width L that is greater than the thickness E of the body, the body being connected to the support plate and the head being connected to the molding element. All or part of the secondary elements comprises a region of connection between the head and the body, the head of the secondary element extending over at most half the height H of this element. The method further comprises a step of detaching the molding element from the secondary elements.

BRIEF DESCRIPTION OF THE DRAWINGS

Other features and advantages of the invention will become apparent from the following description, given by way of nonlimiting example, with reference to the attached drawings in which.

DETAILED DESCRIPTION OF SPECIFIC EMBODIMENTS

In the description which follows, elements which are substantially identical or similar will be denoted by identical references.

Figure 1:
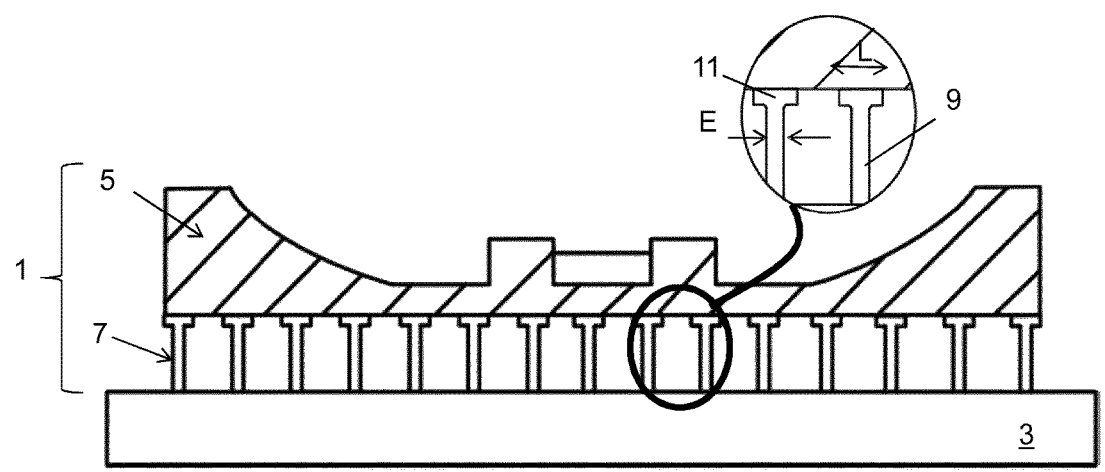
FIG. 1 schematically depicts a view in cross section of a part according to an embodiment of the invention, this part comprising a plurality of secondary elements produced according to a first embodiment of the invention.

FIG. 1 schematically depicts a view in cross section of a part 1 obtained by selectively melting a powder on a support plate 3. This part 1 comprises a main element 5. This main element 5 here forms a molding element for vulcanizing and molding all or part of a tire tread. The part 1 also comprises a plurality of secondary elements 7 evenly distributed between the main element 5 and the support plate 3. The cross section of these secondary elements comprises a body 9 connected to the support plate 3 and a head 11 connected to the main element 5. More particularly, the head 11 has a width L greater than the thickness E of the body 9.

As has already been emphasized, the main element 5 and the secondary elements 7 are formed by selective melting of a powder, it being possible for this powder to be a metallic, organic (ceramic) or plastic powder. The powder may also be a blend of different types of powder.

Figure 2:
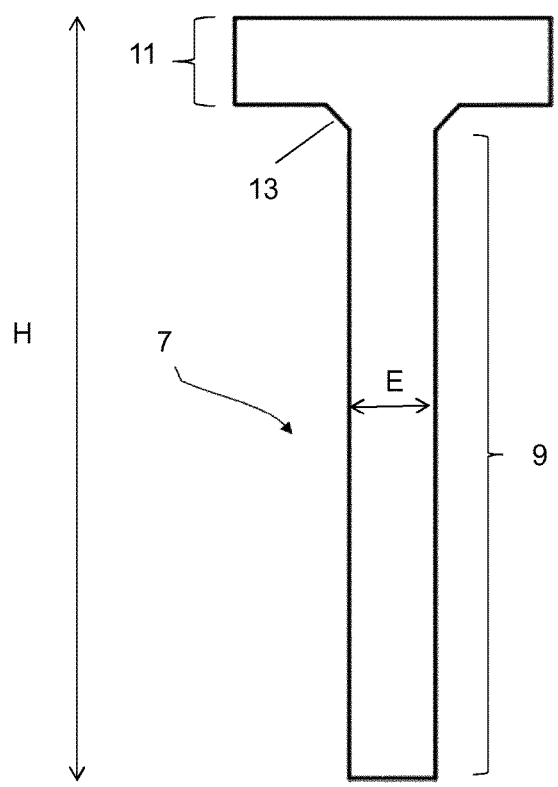
FIG. 2 schematically depicts an enlargement of the secondary element of FIG. 1.

FIG. 2 shows an enlarged view of a secondary element of FIG. 1. This element comprises a region of connection 13 between the head 11 and the body 9. The head 11 of the secondary element extends over at most half the height H of the element 7. For preference, the head 11 extends over at most ⅓ of the height H of the secondary element.

Figure 3:
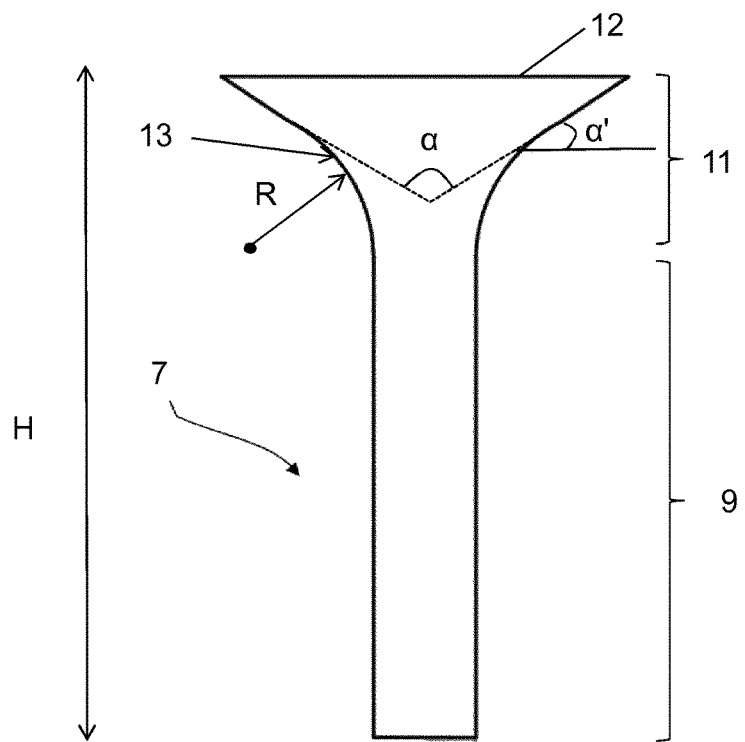
FIG. 3 schematically depicts a secondary element according to a second embodiment of the invention.

FIG. 3 shows an alternative form of embodiment in which the head 11 of the secondary element comprises a region of connection 13. This region of connection here takes the form of a blend radius R. This blend radius is, for example, between 1 and 20 mm, depending on the magnitude of the length of the head 11 of the secondary element. In this embodiment, the head 11 widens progressively from the region of connection 13 with a divergence α. This divergence α is, in this instance, between 20° and 140°. Stated differently, the head 11 has a triangular overall cross section, one of the sides 12 forming a support for supporting the main element 5. The other two sides 14 of the triangle make an angle α' with a direction parallel to the side 12 of the triangle. This angle α' is between 20° and 80°. In this way, it is possible to contemplate secondary elements with a head 11 of sufficient width to support the main element, while at the same time having a body 9 that is relatively thin.

For preference, the divergence of the head is between 90° and 120°.

Figure 4:
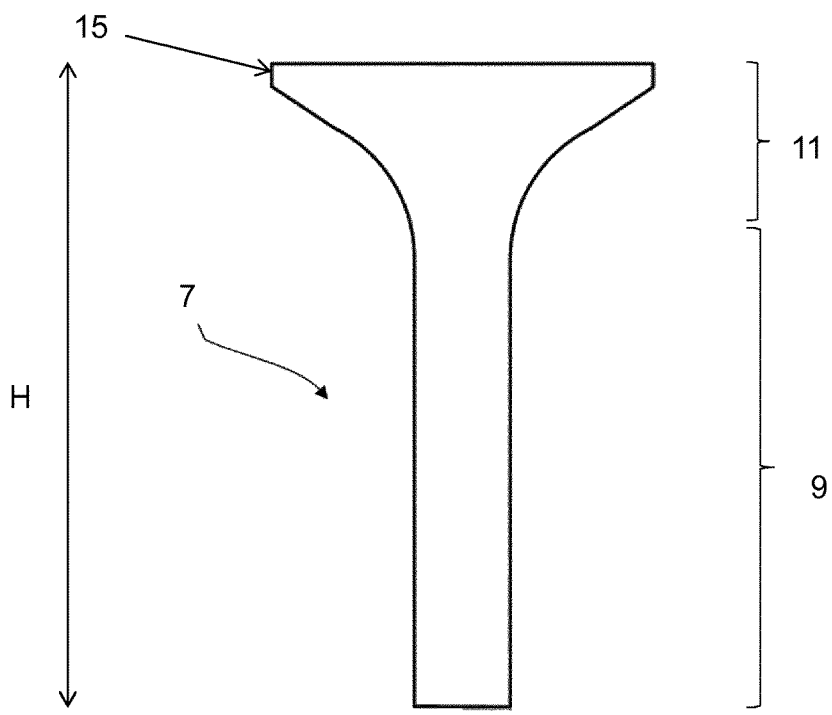
FIG. 4 schematically depicts a secondary element according to a third embodiment of the invention.

FIG. 4 shows another alternative form of embodiment in which the head 11 comprises a head edge 15 of triangular shape. This head edge 15 makes it possible to improve contact between the various secondary elements in order to obtain a continuous surface on which it will be possible to mount the main element 5.

It will be noted that, in the examples of FIGS. 1 to 4, the width of the head 11 is far greater than the thickness E of the body 9. More particularly, the width of the head is at least equal to twice this thickness. By way of example, the thickness E of the body is between 0.1 and 0.5 mm, and for preference, this thickness is equal to 0.3 mm.

In the case of the embodiments of FIGS. 3 to 4 in which the head widens progressively, the width of the head 11 means the mean width of this head.

Figure 5:
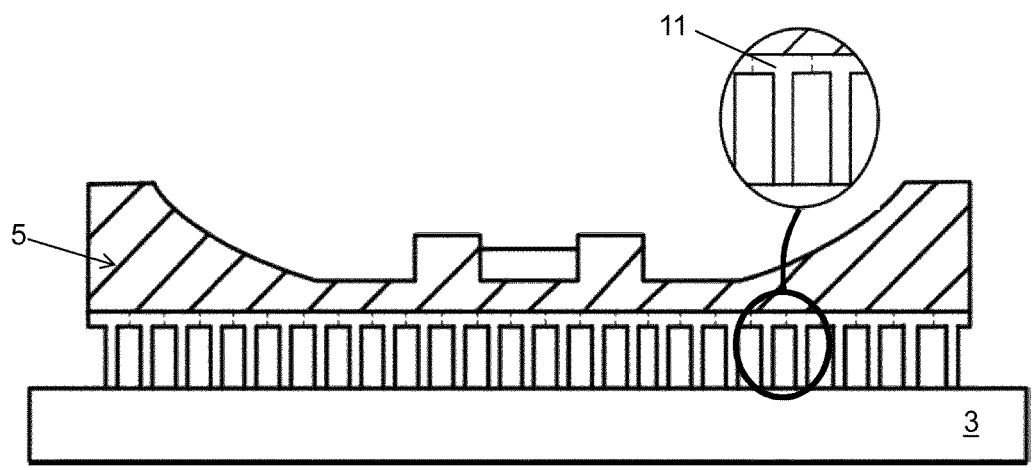
FIG. 5 depicts a plurality of secondary elements produced according to a fourth embodiment of the invention.

FIG. 5 shows a fifth embodiment of the invention, in which the heads 11 of the secondary elements 7 meet at the main element 5. Thus, the main element 5 rests entirely on the secondary elements 7, these secondary elements being evenly distributed under this main element 5.

Figure 6:
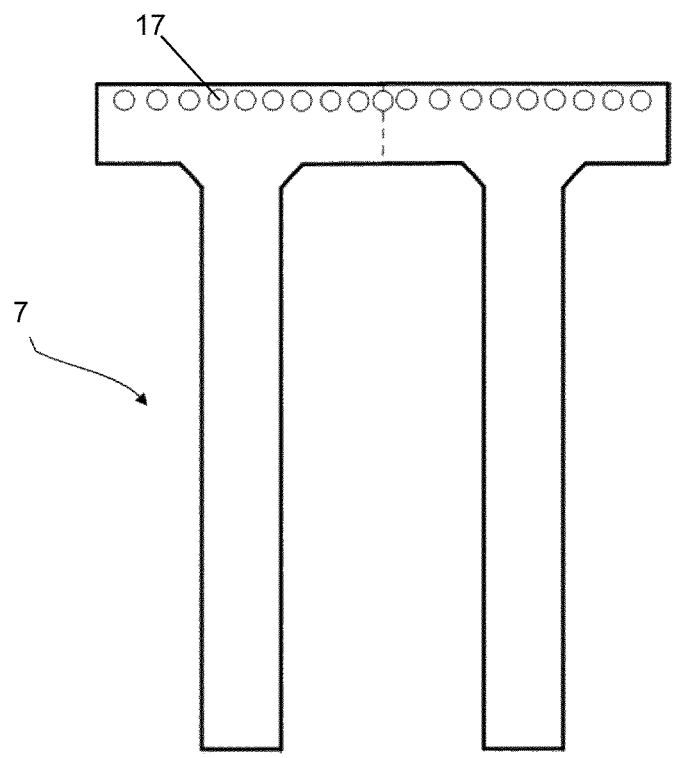
FIG. 6 depicts secondary elements produced according to a fifth embodiment of the invention.

FIG. 6 shows an alternative form of embodiment in which the secondary element 7 comprises mean 17 of detaching this element 7 from the main element. These detachment means are depicted here in the form of contiguous holes.

Figure 7:
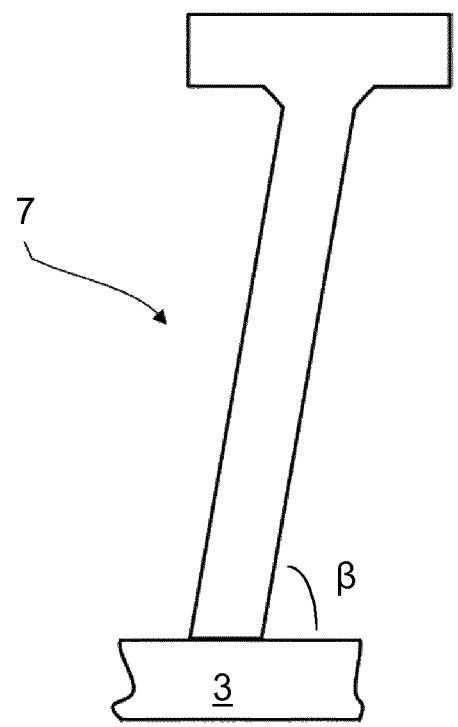
FIG. 7 depicts a secondary element produced according to a sixth embodiment of the invention.

FIG. 7 shows another alternative form of embodiment in which the secondary elements 7 are inclined with respect to the support plate 3. These secondary elements 7 thus form an angle β greater than or equal to 20° with the support plate 3.

Figure 8:
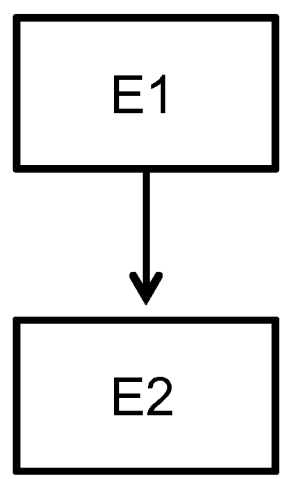
FIG. 8 depicts the steps of a method for manufacturing a part according to FIG. 1.

FIG. 8 illustrates a method of manufacturing a molding element. This method comprising a step E1 of creating rigid secondary elements under the molding element. These secondary elements thus comprise a body and a head which is of a width greater than the thickness of the body. All or part of the secondary elements also comprises a region of connection between the head and the body. In addition, the head of the secondary element extends over at most half the height H of this element. The method also comprises a step E2 of detaching the secondary elements from the molding element.

The invention is not restricted to the examples described and depicted and various modifications can be made thereto without departing from its scope.

Thus, in FIGS. 1 and 5, the main element has been depicted as having a planar lower surface, namely a planar surface for contact with the secondary elements. As an alternative, this lower surface may have a non-planar profile. For example, this lower surface may have one or more curvature(s). If it does, the secondary elements have different heights so as to follow these curvatures.

Furthermore, in FIGS. 1 and 5 the secondary elements extend in the width of the main element, namely in a direction perpendicular to the plane of section of these figures. As an alternative, the secondary elements may extend along the length of the main element.

Finally, the invention may be applied to the manufacture of any type of element other than molding elements.

The invention claimed is:

1. A part obtained by selective melting of a powder on a support plate, this part comprising:
    a main element, and
    rigid secondary elements,
    wherein these secondary elements are arranged between the main element and the support plate,
    wherein the secondary elements are adapted to be detached from the main element,
    wherein all or part of the secondary elements comprises a body of thickness E and a head of width L which is greater than the thickness E of this body,
    the head including at least one contiguous hole,
    wherein the body is connected to the support plate and the head is connected to the main element,
    wherein all or part of the secondary elements comprises a region of connection between the head and the body, and
    wherein the width L of the heads of the secondary elements extend a distance at most half the height H of the secondary elements.

2. The part according to claim 1, wherein the width L of the head of the secondary elements extends over at most ⅓ of the height H of the secondary elements.

3. The part according to claim 1, wherein the region of connection has a blend radius R.

4. The part according to claim 1, wherein the head widens at a constant rate from the region of connection with a divergence α that is uniform.

5. The part according to claim 4, wherein the divergence α of the head is between 20° and 140°.

6. The part according to claim 4, wherein the divergence α of the head is between 90° and 120°.

7. The part according to claim 1, wherein the width L of the head is at least equal to twice the thickness E of the body.

8. The part according to claim 1, wherein the heads of the secondary elements meet at the main element so that this main element rests entirely on the secondary elements.

9. The part according to claim 1, wherein head comprises means of detachment for detaching the main element from the secondary elements.

10. The part according to claim 1, wherein the secondary elements are inclined with respect to the support plate, these secondary elements respectively forming an angle .beta. greater than or equal to 20° with this support plate.

11. The part according to claim 1, wherein the at least one contiguous hole includes a plurality of contiguous holes.

* * * * *